United States Patent
Niemela et al.

(10) Patent No.: US 10,033,746 B2
(45) Date of Patent: Jul. 24, 2018

(54) DETECTING UNAUTHORISED CHANGES TO WEBSITE CONTENT

(71) Applicant: F-Secure Corporation, Helsinki (FI)

(72) Inventors: Jarno Niemela, Helsinki (FI); Veli-Jussi Kesti, Helsinki (FI)

(73) Assignee: F-Secure Corporation, Helsinki (FI)

( * ) Notice: Subject to any disclaimer, the term of this patent is extended or adjusted under 35 U.S.C. 154(b) by 414 days.

(21) Appl. No.: 14/253,228

(22) Filed: Apr. 15, 2014

(65) Prior Publication Data

US 2014/0317754 A1    Oct. 23, 2014

(30) Foreign Application Priority Data

Apr. 18, 2013   (GB) .................................. 1307050.3

(51) Int. Cl.
*G06F 11/00*    (2006.01)
*H04L 29/06*    (2006.01)
*G06F 21/55*    (2013.01)
*G06F 21/62*    (2013.01)

(52) U.S. Cl.
CPC ........ *H04L 63/1416* (2013.01); *G06F 21/552* (2013.01); *G06F 21/6227* (2013.01); *G06F 2221/2119* (2013.01); *H04L 63/20* (2013.01)

(58) Field of Classification Search
CPC . H04L 63/1416; H04L 63/1441; H04L 67/02; H04L 63/145; G06F 13/30; G06F 13/28; G06F 17/3089; G06F 21/10
USPC .......................................................... 726/24
See application file for complete search history.

(56) References Cited

U.S. PATENT DOCUMENTS

| | | | | |
|---|---|---|---|---|
| 8,145,908 B1* | 3/2012 | Liu | ...................... | G06Q 20/401 705/75 |
| 8,239,944 B1* | 8/2012 | Nachenberg | ........ | H04L 63/1416 713/150 |
| 8,543,824 B2* | 9/2013 | Louch et al. | ................. | 713/176 |
| 8,856,545 B2* | 10/2014 | Banerjee et al. | ............. | 713/188 |
| 8,943,588 B1* | 1/2015 | Speegle | ............. | H04L 63/1483 726/22 |
| 8,972,939 B1* | 3/2015 | Allen | ..................... | G06Q 10/06 717/101 |
| 2009/0249445 A1* | 10/2009 | Deshpande | ....... | G06F 17/30887 726/3 |
| 2009/0249484 A1* | 10/2009 | Howard | ................ | G06F 21/567 726/24 |

(Continued)

FOREIGN PATENT DOCUMENTS

JP       2008165292 A     7/2008

*Primary Examiner* — Ali Abyaneh
(74) *Attorney, Agent, or Firm* — Harrington & Smith

(57) ABSTRACT

Methods, apparatus, systems are provided for use in detecting unauthorized changes to websites of web operators. Authorized content policy sets for each of a multiplicity of websites from web operators are collected and stored. In addition, content information obtained in respect web content downloaded from said websites by a multiplicity of client devices, client proxy devices, and/or client gateway devices is used to identify websites that do not conform to respective policy sets. Alerts are sent to the web operator of any non-conforming website. Optionally, alerts may be sent to client devices, client gateway devices, and/or client proxy devices for use in scanning or blocking the web content from non-conforming websites.

22 Claims, 4 Drawing Sheets

(56) References Cited

U.S. PATENT DOCUMENTS

| | | | |
|---|---|---|---|
| 2010/0037062 A1* | 2/2010 | Carney | H04L 9/3247 713/176 |
| 2010/0235910 A1 | 9/2010 | Ku et al. | 726/22 |
| 2011/0167108 A1 | 7/2011 | Chen et al. | 709/203 |
| 2011/0314152 A1* | 12/2011 | Loder | G06F 17/30887 709/225 |
| 2012/0210435 A1 | 8/2012 | Niemela | 726/26 |
| 2012/0324551 A1 | 12/2012 | Bretschneider et al. | 726/5 |
| 2013/0074185 A1* | 3/2013 | McDougal et al. | 726/24 |
| 2013/0097700 A1* | 4/2013 | Chen | H04L 63/126 726/22 |
| 2013/0173782 A1* | 7/2013 | Ragutski | H04L 63/123 709/224 |
| 2014/0331119 A1* | 11/2014 | Dixon | H04L 63/168 715/234 |

* cited by examiner

DETECTING UNAUTHORISED CHANGES TO WEBSITE CONTENT

TECHNICAL FIELD

The present invention relates to detecting unauthorised changes to website content and in particular to methods and apparatus carried out by a system or one or more servers, a web operator, apparatus for a client device, a client gateway device or a client proxy device for detecting unauthorised changes in content of a website of the web operator.

BACKGROUND

Whilst the Internet represents a huge source of valuable information, much of the content that is available online is inappropriate or malicious, or indeed illegal. By its very nature, it is not always easy to track and eliminate such content. Such content may be malicious, for example malware capable of stealing individual's bank details, or pornographic. The best way for organisations and individuals to protect themselves against inappropriate content is to install onto their web servers and/or client devices security software, which filters outgoing content requests and/or downloaded data to remove unsuitable content.

A client device may comprise or represent any device used to access content from a website over one or more communication network(s) eg. wired and/or wireless communication networks. Examples of client devices that may be used in certain embodiments of the invention are wired or wireless devices such as mobile telephones, terminals, smart phones, portable computing devices such as lap tops, handheld devices, tablets, net-books, computers, personal digital assistants and other devices that can access website content and connect over a wired or wireless communication network.

A client gateway device may comprise or represent any device, network node, or server used for directing network traffic to client devices from one or more communication networks. Examples of client gateway devices that may be used in certain embodiments of the invention are devices, network nodes or elements, or servers such as residential gateways, gateway servers, gateway nodes, Wi-Fi routers/modems, DSL routers/modems, network address translator devices, protocol converters, cloud gateways, gateway devices connecting/between different communication networks, a network node configured to interface with another network that uses different protocols to direct/route network traffic to client devices, or any other device or proxy device that directs and/or routes network traffic over communication networks to the client device.

A client proxy device may comprise or represent any device, network node or server, that acts as an intermediary for client devices seeking resources over communication networks. Examples of client proxy devices that may be used in certain embodiments of the invention are devices or network elements such as proxy servers, forward proxy servers, reverse proxy servers, cloud storage or cloud servers, web proxies, web proxy servers or any other device or proxy device that acts as a cache for storing and distributing network resources over the communications network to client devices.

A web operator may comprise or represent any entity, person or team, or third party that is responsible for and/or manages the content of one or more websites. Examples of web operators that may be used in certain embodiments of the invention are webmasters, web owners, content authors, administration teams, or the person(s) responsible for creating and/or managing the web content or (web page content) of a website or of the web content of a company and/or knows exactly and/or authorise the publication of the content on the website.

Malicious content may be installed onto a website of a web operator by hackers using web page injection attacks. One type of attack is the "watering hole" attack where an attacker compromises a website or content provider that a type of user will eventually access (e.g. a special interest website) to serve malicious content to the end user. As such, a specific type of user is targeted, much like prey being stalked and attacked by predators at a watering hole. The compromise can simply be injecting the website with an exploit kit that loads an exploit to the user system when they access the website.

Alternatively, a script (e.g. a Java script RTM) may be added that includes from some other domain that distributes malicious content from seemingly random sites. But in all cases the pattern is the same, the website starts to offer unauthorised content to some or all users accessing the website.

Unauthorised content may also be inadvertently or illegitimately hosted on a website, or the website may be compromised for use as a drop point or malware command and control (C&C) point for covert communications, illegal or stolen material. For example, illegal porn, terrorist or a pirate communication board or simple file drop box may be hosted as a sub page under a legitimate website such that illegal porn, terrorist or pirated material is distributed. Other examples may include websites that were compromised and not thoroughly "cleaned" or the malware or compromised content remains unidentified such that the website is still being used as communication drop boxes or malware C&C point. As such, the website can offer content unbeknownst to the web operator and to legitimate users.

Another type of attack based on unauthorised local modifications to web page content that defrauds users into giving away their personal identity or bank information. For example, on a banking website, the website may have been injected with malware that compromises web traffic and includes additional input fields to get a user to handover their sensitive personal information, or phone model and number in order to serve malware to the users' phone or client device and bypass two factor authentication. Only users with infected client devices may get the extra question fields, while clean users may not.

Accidental website content may also be unwittingly served to users from advertising content providers hosted on the websites such that the website serves unauthorised content to users (e.g. pornographic material or contradictory information to that presented on the website). As an example, some advertising providers may not always be very stringent on the types of advertising they serve to websites, and a web operator (or website owner) can end up in a situation where the advertising content provider serves unwanted material on an otherwise clean website. This can be harmful to end users.

Internet security software may be installed on a user's client device that scans downloaded data for the presence of malware or identify unsafe content following a user or client device initiated request to download content from the Internet. This identification may occur either prior to a web page being downloaded or prior to it being displayed or otherwise processed on the client device. The approach relies on the maintenance at a central rating server of a website rating database. For each web page, as represented by a Uniform Resource Locator (URL), the database holds a rating indicating the nature of and threat posed by the web page. A rating indicates, for example, whether the content within a web page is suitable for children, is suitable for children but under adult supervision, or is completely inappropriate for children. The rating may also indicate whether the web page is known or likely to contain malware.

Whenever a web browser (or other application capable of accessing content at a website, for example an email client) sends a request to obtain content from a website, or perhaps sends a DNS look-up request to obtain an IP address for a URL, the request is intercepted by the Internet security software and the URL associated with the request is simultaneously sent to the rating server where the rating database is maintained. The rating server obtains the rating information for the web page (URL) in question, and returns this to the security application at the user's client device. The security application buffers any content received from the website associated with the request until such time as the rating has been received from the rating server. Depending upon the nature of the rating information, the security software may block (further) downloading of the content or processing (e.g. display) of already downloaded content and provide a warning to the user depending. Of course, if a rating indicates the website may contain malware such as a computer virus, downloading and processing is blocked.

The rating-based approach described above works well for websites having relatively static content, or at least content which does not change greatly in terms of its nature over time. However, the dynamic nature of many websites and the many types of attacks that a website may be exposed to represents a potential problem for security providers when attempting to identify and categorise web content. Due to limited resources, the providers of Internet security services are unable to access (e.g. using web speeding techniques) and re-rate websites on a regular basis. Changes in the content available at a particular website can remain undetected for several months or even longer. Thus, a web page of a website that is rated as benign may in fact harbour malicious, inappropriate or unauthorised content. This is not only dangerous from the point of view of the user, but will also reduces the user's trust in the security service, which may subsequently be turned off or uninstalled exposing the user to further malicious or unauthorised content.

Another approach is described in U.S. patent application Ser. No. 12/932,015 filed on 16 Feb. 2011 by the same applicant as the present invention, which reduces the risk of users and their client devices being exposed to inappropriate or malicious web content as a result of the above-mentioned periodic rating checks being carried out on such web content. U.S. patent application Ser. No. 12/932,015 describes performing a security check at a user's client device on web page content downloaded to the client device over the Internet. Rating information for the web page is retrieved from a web service over the Internet, the rating information includes one or more content ratings and a first signature generated from the content, using a specified algorithm, at substantially the same time as the or each content rating was determined. The downloaded web page content is then processed on the client device using the specified algorithm to generate a second signature. The first and second signatures are compared and the differences therebetween quantified. The client device then determines whether the quantified difference exceeds a threshold value. If not, then the received content rating(s) is(are) trusted. If yes, then the result is reported to said security service.

However, while such a system is an improvement over server generated web ratings, such a system is still fraught with risk to the end user as the security service provider still needs to generate numerous ratings for each web page. Delays updating web ratings will lead to inaccurate ratings being provided to users, resulting in inaccurate detection of malicious content. In addition, false alarms are generated every time a content author or web operator updates the website and the web rating has not yet taken into account the changes. As well, the client device is required to perform a large amount of processing for downloading, determining and comparing web rating signatures, and due to an apparent mismatch may report possibly authorised or legitimate content as malicious to the security service. This will affect users' experience of a web operator's website.

SUMMARY

It is an object of the present invention to reduce both the risk to users and their client devices being exposed to inappropriate or malicious web content whilst minimising false alarms as a result of legitimate changes to such web content and/or computational load on client devices or client gateway devices.

According to a first aspect of the invention there is provided a method carried out by a detection system for detecting unauthorised changes to a website. The method includes collecting and storing authorised content policy sets for each of a multiplicity of websites from web operators. Receiving from a multiplicity of client devices, client proxy devices, or client gateway devices content information obtained in respect web content downloaded from said websites. Using said content information to identify websites that do not conform to respective policy sets, and sending an alert to the web operator or web operator device of any non-conforming website.

Embodiments of the invention substantially reduce the number of false alarms caused by legitimate changes in web content, while at the same time reducing the risk of users and their client devices being exposed to inappropriate or malicious web content. The advantages of prompt reporting of changes in web content allows a web operator to quickly take down inappropriate or malicious web content, and allows a security service provider to quickly disseminate up to date information about the website to users' client devices. Further advantages of the present invention provide minimising false alarms by the web operator updating the authorised content information (or web information) of the website on the system, and even if the web operator or content author forgets to update the content information, the update can be performed as soon as a notification is received reporting a change in content on the website.

According to a second aspect of the present invention there is provided a method carried out by a web operator or web operator device for detecting unauthorised changes to a website of the web operator. The method including sending authorised content policy sets for one or more websites to a detection system for use in detecting unauthorised changes to the one or more websites. The web operator or web operator device receives an alert from the detection system identifying a website not conforming to a respective policy set. The web operator or web operator device may determine whether the change to the non-conforming website is unauthorised.

Optionally, the web operator or web operator device sends a response message to the detection system indicating whether or not the change to the non-conforming website is unauthorised. As an option, the step of sending the authorised content policy set(s) may include placing the authorised content policy set(s) in a digitally signed information manifest associated with one or more website(s), and sending a digital key associated with each manifest to the detection system for accessing the authorised content policy set(s). Optionally, the digital manifest may be an additional file associated with the one or more websites, or each digital manifest may be embedded as a hidden field in one or more web pages of each website. The digital manifest may alternatively be sent to the detection system.

According to a third aspect of the invention there is provided a method carried out by an apparatus for detecting unauthorised changes to a website. The method including downloading web content from the website and obtaining content information from the downloaded web content of the website. The apparatus transmits the content information to a detection system for use in identifying whether the website conforms with a respective authorised content policy set. The apparatus may receive a warning from the system indicating a change to the website is unauthorised. Optionally, the apparatus may be included in at least one of client device, a client gateway device, and a client proxy device.

According to a fourth aspect of the invention there is provided a subscription service for detecting unauthorised changes to websites. The service including registering one or more websites by one or more web operators, providing the service of uploading authorised content policy sets for the registered websites from the web operators. Receiving from registered client devices or client gateway devices content information obtained from downloaded web content of the registered websites. Using the content information to identify whether the registered websites conform to respective authorised content policy sets, and sending an alert to the web operator of any non-conforming registered website.

Further aspects of the invention provide detection system, web operator devices, apparatus, and computer readable medium(s) comprising program instructions, which when executed on a processor, perform the methods described herein as set forth in the appended claims.

Further features of the invention are outlined in the appended claims.

DETAILED DESCRIPTION

Figure 1:
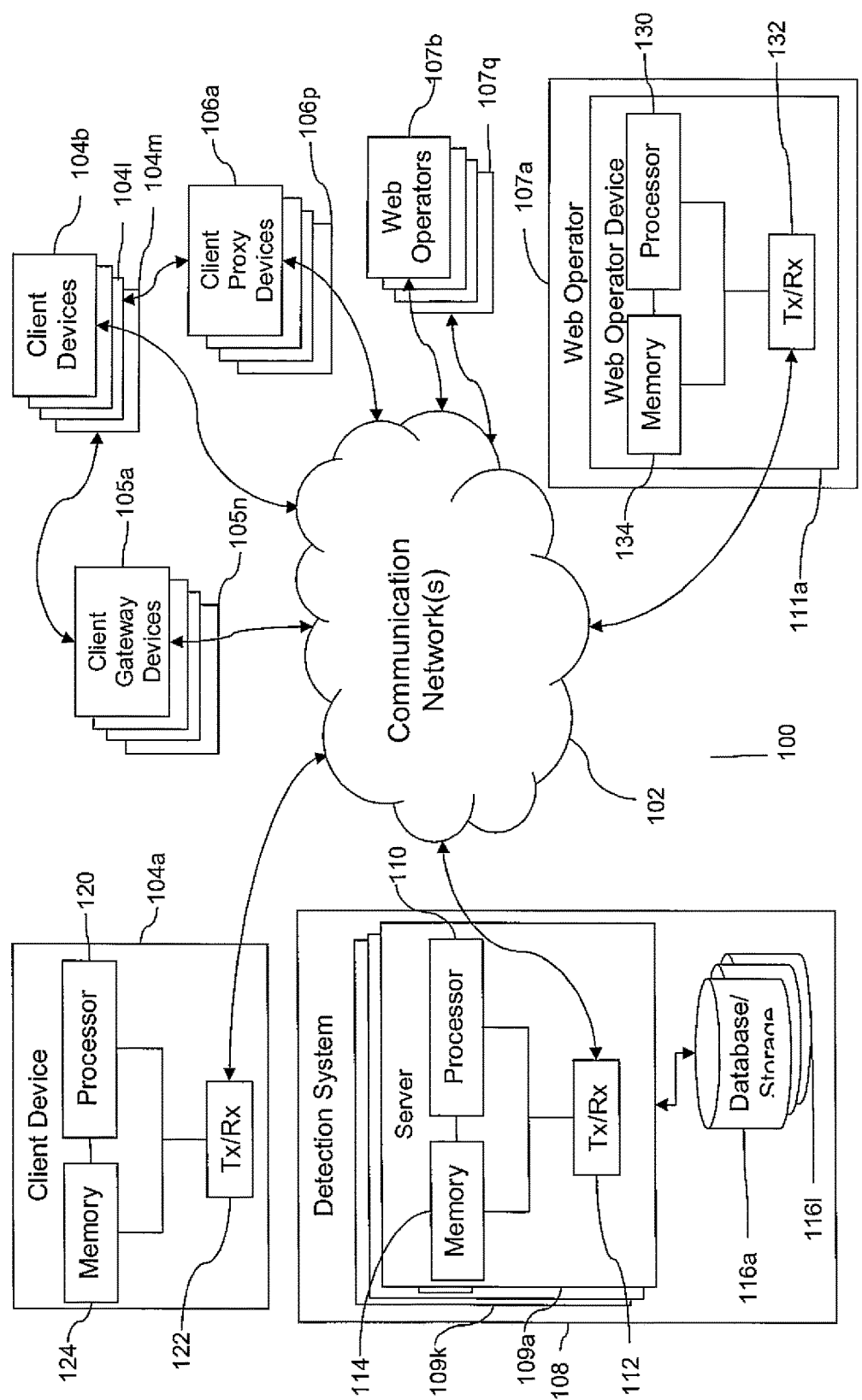
FIG. 1 is a schematic diagram illustrating a detection system for detecting unauthorised changes to websites.

As has been discussed above, the dynamic nature of the Internet makes it possible for the content at a particular website to change at any time in such a way that the website starts to serve web content that is not intended for the user such that the website is no longer safe for end users to access. This presents a security risk for both end users and for their client devices. It is proposed here to address this problem by including a detection service, provided by a security service provider, over the Internet to both client devices and web operators, for detecting unauthorised changes to content of a website. This is achieved by a detection system using received content information obtained from web content downloaded by a multiplicity of client devices or client gateway devices to identify websites not conforming with a respective collected authorised content policy set, which describes a set of policies and/or rules that define the allowable and/or authorised web content of the one or more web pages of the website. This provides the advantage of reducing the resources necessary for web operators to continually police their websites while also providing rapid detection of malicious content or attacks on a website and substantially reducing the effects of such attacks.

The detection system of the present invention is based on sending content information obtained from web content downloaded by client devices, client gateway devices, or client proxy devices to a detection system comprising one or more backend servers, which uses previously approved or authorised content policy sets with the received content information and reported content information by the web operator (or website owner). As multiple client devices will be accessing a website, this allows early detection of the situation when a website starts to serve content that is not intended by the web operator, which can be an indication of a compromised website, or a compromised (advertising or other) content feed provider imported by the website that is being shown to the user.

The authorised content policy set for a website is a set of one or more rules and/or policies that define the web content and/or content information that the web operator has approved the website can serve to client devices (client proxy devices and/or client gateway devices). This is intended as a guide or map of the web content and/or content information such as, by way of example only, technologies, content types and inputs that have been authorised to be used in the one or more webpage(s) of the website, and the type of information that is not allowed to be requested or shown by the website. The policy set may also include blacklisted content, for example, this website is not allowed to host specific types of files unless they are linked to a specific path or URL.

For example, a policy set may include a rule or policy indicating that "the addition of Java applet(s) or flash object(s) apart from those already approved is not allowed", which may indicate a significant change to a website. As another example, the policy set may include a rule or policy indicating "setting allowable destination servers where form input data is submitted", any changes to the web page may be considered benign if the original server does not change, however if data goes to a different server, then the change may be considered malicious. The rules and policies of the authorised policy set may be expressed in any form, for example, a natural language, logical statements, other languages, programming languages, rules languages, standard rules languages, proprietary rules languages, semantics and/or expressions such that the formulation of the rules and policies in the authorised content policy set is suitable for a rules system (or rules engine, processor, or expert system) to implement the authorised policy set. For example, the rules and/or policies of an authorised content policy set may be based on the Rule Interchange Format (of which there are numerous standard and non-standard RIF dialects) and used with a rule system or rule engine for determining whether websites conform to the authorised content policy set based on obtained content information associated with the websites, where the obtained content information is obtained from web content downloaded by client devices, client gateway devices and client proxy devices.

The content information (and content information elements) conveys representative details of the web content of one or more web pages of a website. The content information of one or more web pages of a website may include, by way of example only, one or more of content information elements such as the types of application technologies used in the web page or website, locations of resources from where web content of the website is accessed, ratings of web content subcategories, user input fields, web content feeds, and types of web content allowed for the website.

For example, content information the types of technologies used in the site may be vbScript, Jscript, Java Applets, Flash objects, Active X, Javascript redirects, etc; the locations or uniform resource locators (URLs) of other web pages or websites from which the website is allowed to redirect a user or load scripts from; the type of form inputs are being shown to the user; web content types (e.g. EXE or PDF files), inputs and web content that are not allowed to be used on webpage(s) of the website. By way of example only, the content information may include, but is not limited to, one or more content information elements from the group of:

Technologies, executables, or applications used by the web page or website (eg. vbScript, Jscript, Java Applets, Flash, flash player, Javascript, silverlight, exe downloads);

Resources from where web page content is loaded from;

Resources from where input form content is save to;

Internal content such as downloadable executable code such as software applications, scripts, etc (e.g. if the website is owned by, or represents a software vendor then executable code may be driver update installation files, which are allowed to be downloaded via www-.softwarevendor.com/downloads/drivers and no nowhere else);

Domains and/or locations (e.g. domain names and/or URLs) from where external content is loaded (eg. f.ex, flash, or java script);

Domain and locations of any redirection URLs or links;

Rating of the content per subcategory; and

Any possible malicious content such as adult, hate, etc either on main site or on one of the content feeds, such as an advertiser serving porn material that is then displayed on the website;

Any other content information, content information elements or content types of web content that may be required to be extracted from a web page due to being able to be used maliciously or abused in future.

In order to determine the content information for one or more web pages of a website or the website itself, the content information that defines the web content on the web page or website needs to be identified. This is usually performed by the web operator of the website, but may be performed by the detection system or a third trusted party. The web operator authorises the determined content information to create authorised content information that is considered to be representative of a fingerprint of the current web content of the web page(s) or website of the web operator.

In particular, the content information associated with a web page may include content information comprising one or more content elements that represent the underlying structure of the web page or website or how data or content of the web page or website is delivered or represented to the user's client device. The web operator, detection system or trusted third party then determines the content policy set that is associated with the authorised content information. The content policy set may include, but is not limited to, one or more policies or one or more rules for determining what content information is allowable and what content information is not allowable on the website.

The content policy set may be based on authorised content information comprising one or more content elements from the group of:

Technologies and/or resources such as executables or applications being used by the web page or website (eg. vbScript, Jscript, Java Applets, Flash, flash player, Javascript, silverlight, exe downloads);

Acceptable locations from where given resources may be loaded from
    Allowable/unallowable resources from where web page content is loaded from;
    Allowable/unallowable domains and/or locations (e.g. domain names and/or URLs) from where external content is loaded (eg. f.ex, flash, or Java script);
    Domain and locations of any redirection URLs or links;
    For example, executables (eg. EXEs) are allowed only from directory X
    For example, the technology/application Flash is allowed to be accessed/executed only from directory X or from server Y
    For example, JavaScript is allowed only from X or from Y external domains Acceptable website visitor/customer/user/browser locations such as physical locations or logical locations (e.g. physical locations mapped by geo IP, or locations based on an IP address whitelist of allowed customers) from where given resources may be used
    For example, generate a warning if some beta content or restricted content leaks Acceptable user input forms and fields
    Resources from where input form content is saved to;
    For example, count of user input fields, total sum and counter per type; and
    For example, count of fields where field description contains mention of email, phone number or other identifying information;

Types of content allowed for the web page or website;
    Any possible malicious content such as adult, hate, etc., either on main site or on one of the content feeds, such as advertiser serving porn material that is then displayed on the website;
    For example, whether the website is allowed to have adult material;
    For example, the intended classification of the website (e.g. a business website is not supposed to have hate content on any of its web pages);

Internal content such as downloadable executable code such as software applications, scripts, etc (eg. if the website is for software vendor then executable code may be driver update installation files, which are allowed to be downloaded via www.softwarevendor.com/downloads/drivers and no where else);

Rating of the content per subcategory; and

Any other allowable or unallowable content information, content information elements or content types of web content that may be required to be extracted from a web page due to being able to be used maliciously or abused in future.

Once the content policy set for one or more web pages or the website is determined and approved or authorised by the web operator, the content policy set then becomes an authorised content policy set for the web pages or web site and is a "snapshot" of the web content on the corresponding web pages or web site. The authorised content policy set is then uploaded to the detection system for use in checking whether one or more pages of a website or the website conforms to the authorised content policy set.

Client devices (client gateway devices or client proxy devices) may be provided with a client program or module such as a client security/extraction/content inspection program or module that is able to inspect the web content downloaded from a web page and obtain the content information of the downloaded web content. Note, client gateway devices or client proxy devices (e.g. content inspection gateway or proxy) may also be provided with such modules/programs for rendering the web content in the same way as the client device would, which would allow earlier inspection of web content and earlier detection of a change in content of the website delivering such content. For simplicity, the following description and/or examples of the present invention will be described with reference, by way of example only, to client devices. However, it is to be appreciated by the person skilled in the art that the functionality of the invention that is bestowed on client devices or even the detection system may also be applied to client gateway devices and/or client proxy devices, or any other network node, element or device that may be used for distributing/routing/intercepting web content from websites to client devices.

The content information may be included in a query, summary or report that is sent to the detection system of a security service provider. The detection system will then receive from a multiplicity of client devices (client proxy devices and/or client gateway devices) content information obtained in respect of web content downloaded from one or more websites. The detection system uses the content information received in respect of each website for checking against the authorised content policy sets of each website to determine whether one or more of the web pages of the website conforms with the authorised content policy set of the website. As there are a multiplicity of client devices (or client proxy devices and/or client gateway devices), there will be higher chance that the detection system receives from at least some of the multiplicity of client devices (or client gateway/proxy devices) content information obtained in respect of web content downloaded from the same web page of a website. This provides the advantage of the detection system receiving content information from a multiplicity of client devices downloading web content from a website is that malicious attacks such as "watering hole" style attacks that target only specific groups of users or client devices are more rapidly revealed to web operators.

As an example, the client program or module may instruct a processor of the client device to inspect the web content (web page content) as it is being rendered in the browser of the client device and may enumerate the content information from a template list that contains either present/not present fields, counters or word match fields. In essence, the client program or module builds a map of content information based on a predefined content information template of everything in the web page of the website that the detection system or the operators of the detection system (or even web operators) consider relevant in relation to checking whether a website conforms with a corresponding authorised content policy set.

The map of content information may be structured so that new content information fields or content information element fields can be added when needed. For example, due to the dynamic nature of the various protocols, standards, applications, programming and web page languages that may be used in connection with a website/web page, it will be inevitable that new or updated types of content information or content information elements will need to be defined for checking against a corresponding content policy to guard against current and future malicious attacks on a website. The client device or its program or module may be updated with the new or updated content information, e.g. a template and/or script that may be used to build the content information is updated.

Content information obtained with respect to web content downloaded from said websites by client devices (client proxy devices and/or client gateway devices) are used by the detection system to identify or check whether the website still conforms to its authorised content policy set. If the website does not conform to some or all of the rules and/or policies of the authorised content policy set for the website, then the website may be considered to be a non-conforming website. The detection system may alert the web operator of any non-conforming website, so that the web operator may take action to confirm whether the non-conformance is due to a website update, or malicious attack on the website. If the latter, the web operator may take action to restore the website by removing the malicious content from the website. An updated authorised policy set for the website may need to be sent to the detection system for future checks.

The determination of a non-conforming website triggers the server to send an alert message or notification to the web operator so that the web operator may determine whether the change in web content was authorised or not (e.g. the web operator may have updated their website, so the change may have been authorised). The alert may be communicated from the detection system to the web operator via a communication system such as, by way of example only, email, a portal web site providing the detection service, a telecommunication network or system, via a message to a fraud control system using the necessary communication protocol of the fraud control system.

Once the alert is received by the web operator, the alert may cause the web operator to update their authorised content policy set stored by the detection system if the change was legitimate or authorised. The alert provides the advantage of assisting the web operator and detection system to maintain an up-to-date database/storage of authorised content policy sets for the web page(s) and/or website(s) managed by each web operator. If the change in content is unauthorised, then the web operator is immediately warned of the change and has the opportunity to, by way of example only, take down the web content that does not conform to the authorised content policy set (e.g. remove any malicious content or exploit from the website).

At the same time, if the detection system determines or the web operator indicates that the change in web content is unauthorised, then this may trigger the detection system to alert or notify the user's client device (or client proxy device or client gateway device). The alert or notification may cause the user's client device (or client proxy device or client gateway device) to begin scanning or blocking access to the web content that is not conforming to the authorised content policy set for the website. This may include, by way of example only, scanning or blocking access to subsequent downloaded web content associated with the non-conforming web content, and/or block access to the downloaded web content not conforming to the authorised content policy set, and/or to at least present a warning to the user that unauthorised changes to the web page(s) of the website have been made. Depending on the nature of the changes, e.g. if a watering hole attack is detected, a security application (e.g. virus scanner) on the client device (or client proxy device or client gateway device) may begin scanning the client device (or client proxy device or client gateway device) to remove the downloaded exploit kit, malicious content or application. The security application may then continue to scan the web content associated with the changes.

As an example, a banking website may have a login webpage that includes technologies such as Java Script and form inputs for use in validating a user (e.g. login, password, memorable answers), i.e. a form input may ask for one disposable key code, and or locations or URLs of other banking web pages/websites that are allowed. By way of example only, the web operator may authorise a content policy set that is are arranged to specify that "an input form may not ask for more than one key code", or "more than one keycode is not allowed in the login webpage", "Java Script is allowed in the login webpage", "vBScript or Flash objects are not allowed in the login webpage", "Only two form inputs are allowed in the login webpage", "the location href=/½/current-accounts/bankaccount is allowed in the login webpage", etc. Although the above authorised policy set is specified, for illustrative purposes, in a natural language style, it is to be appreciated that any format may be used to define the rules and/or policies of the policy set such that the detection system can interpret the policy set, or the operator of the detection system can input the policy set.

The login webpage may be maliciously modified such that the login webpage includes an input form that now asks for the next three key codes and/or includes a surreptitious link to href=www.bank100xxx.com. When a client device (or a client gateway device) downloads the modified login webpage, a security program or content information extraction program or module may extract a predefined set of content information from the downloaded web content. This content information may include all of the types of technologies used in the site, the locations or uniform resource locators (URLs) of other web pages or websites from which the website is allowed to redirect a user or load scripts from; the type of form inputs are being shown to the user; the type of information being requested by the website; or any other information based on the web content of the modified login page that the extraction program has been designed to extract from the webpage. The content information that is obtained will include "an input form that asks for the next three key codes" and also "the location to link href=wwwbank100xxx.com". The client device sends the obtained content information to the detection system. The detection system uses the received content information to identify whether the website conforms to its respective authorised content policy set. Since the content information includes the above modifications (e.g. "an input form that asks for the next three key codes" and "the location to link href=wwwbank100xxx.com"), the detection system will determine that the website does not conform to the authorised policy set of the website and alert the web operator accordingly.

The present invention provides the advantages of further reducing both the risk to users and their client devices from being exposed to inappropriate or malicious web content, minimising the computational load on the client device and hence possible delays in determining whether changes to content are authorised or unauthorised. At the same time, false alarms are minimised as a result of legitimate changes by web operators to such web content. Prompt reminders and reporting of changes in web content to web operators is enabled, allowing a web operator to quickly take down inappropriate or malicious web content, and allowing a security service provider to quickly disseminate up to date information about the website to users' client devices.

FIG. 1 is a schematic diagram illustrating a communication system 100 for use in detecting unauthorised changes to content of one or more websites according to the invention. The system 100 includes one or more communication network(s) 102 (eg. the Internet or an Intranet or both) over which a multiplicity of client devices 104a-104m, client gateway devices 105a-105n, and/or client proxy devices 106a-106p, and a plurality of web operators 107a-107q communicate with a detection system 108. Each of the plurality of web operators 107a-107q may operate one or more of a plurality of websites in the communication network(s) 102.

The detection system 108 may include one or more servers 109a-109k, each server 109a may include a processor 110, a transmitter/receiver unit 112, and a memory unit or memory 114 connected to each other. The transmitter/receiver unit 112 may be configured for communicating with the multiplicity of client devices 104a-104m, client gateway devices 105a-105n, and/or client proxy devices 106a-106p over communication network(s) 102. The detection system 108 is also configured for communicating with the multiplicity of web operators 107a-107q over communication network(s) 102. The memory 114 can be for use in collecting and storing data and applications, and the processor 110 may execute the applications, and among other things, applications or processes for detecting unauthorised changes to one or more websites hosted or operated by the web operators 107a-107q. The detection system 108 may also include or have access to one or more database(s) 116a or storage for collecting and/or storing authorised content policy sets for each of the plurality of websites from the plurality of web operators 107a-107q. The database 116 may also include maintaining a record of authorised content policy sets with each of the websites or associated with each web page of each of the websites. The database 116 may also store the content information obtained from client devices 104a-104m, client gateway devices 105a-105n, and/or client proxy devices 106a-106p, in which the obtained content information may be associated with each authorised content policy set and hence each website and/or web page etc.

For example, a web operator for a banking website might enter all the authorised content policy set for a website, e.g. www.webbank.com, or they may enter only general content policy set (or information) for the top web page of the website and then separate authorised content policy sets (or separate information) for the URLs of the website that are used for user authentication and transaction information. The detection system 108 can also include other processing resources (eg. a neural network or expert knowledge system) or storage media for storing, processing and accessing data or information required by said one or more servers, applications, or processor 110.

Although the detection system 108 may include one or more servers 109a-109k (e.g. back-end servers) in communication with each other, it is to be appreciated that detection system 108 can include any computing system (distributed or centralised) that includes storage, processing, and communications hardware and/or software that performs the collection and maintenance of authorised content information for each of a plurality of websites from a plurality of web operators for use in detecting unauthorised changes to one or more websites.

The client device 104a also includes a processor 120, transmitter/receiver unit 122, and a memory 124, which are connected with each other. The transmitter/receiver unit 122 may be configured for communicating over the communication network 102 with server system 108. The memory unit or memory 124 can be for use in storing data and applications (e.g. anti-virus or security software), and the processor 120 may execute the applications, and among other things, applications or processes for detecting unauthorised changes to content of one or more websites that user of the client device 104a accesses, and/or security applications or processes for use in scanning the websites and/or the client device 104a. Client devices 104b-104n may be configured in a similar manner.

Similarly, the client gateway devices 105a-105n may comprise or represent any device, network node, or server used for directing network traffic to client devices 104a-104m from one or more communication networks. Examples of client gateway devices 105a-105n that may be used in certain embodiments of the invention are devices, network nodes or elements, or servers such as residential gateways, gateway servers, gateway nodes, Wi-Fi routers/modems, DSL routers/modems, network address translator devices, protocol converters, cloud gateways, gateway devices connecting/between different communication networks, a network node configured to interface with another network that uses different protocols to direct/route network traffic to client devices 104a-104m, or any other device or proxy device that directs and/or routes network traffic over communication networks to the client devices 104a-104m. As an example, the client gateway devices 105a-105n may each include a processor, transmitter/receiver unit, and a memory, which are connected with each other. The transmitter/receiver unit may be configured for communicating over the communication network 102 with detection system 108. The memory unit or memory can be for use in storing data and applications (e.g. anti-virus, security software, gateway routing software), and the processor may execute the applications, and among other things, applications or processes for detecting unauthorised changes to content of one or more websites that a user of the client device 104a accesses, and/or security applications or processes for use in scanning the websites and/or the corresponding gateway devices 105a-105n.

Similarly, the client proxy devices 106a-106p may comprise or represent any device, network node or server, that act as an intermediary for client devices 104a-104m seeking resources over communication networks. Examples of client proxy devices 106a-106p that may be used in certain embodiments of the invention are devices or network elements such as proxy servers, forward proxy servers, reverse proxy servers, cloud storage or cloud servers, web proxies, web proxy servers or any other device or proxy device that acts as a cache for storing and distributing network resources over the communications network to client devices 104a-104m. As an example, the client proxy devices 106a-106p may each include a processor, transmitter/receiver unit, and a memory, which are connected with each other. The transmitter/receiver unit may be configured for communicating over the communication network 102 with detection system 108. The memory unit or memory can be for use in storing data and applications (e.g. anti-virus, security software, gateway routing software), and the processor may execute the applications, and among other things, applications or processes for detecting unauthorised changes to content of one or more websites that are cached on one or more of the client proxy devices 106a-106n, or accessed by a user of the client device 104a and stored on one or more of the client proxy devices 106a-106n, and/or security applications or processes for use in scanning the websites and/or the corresponding client proxy devices 105a-105n.

The web operator 107a may use a web operator device 111a may include a processor 130, transmitter/receiver unit 132, and a memory 134, which are connected with each other. The transmitter/receiver unit 132 may be configured for communicating over the communication network 102 with detection system 108. The memory unit or memory 134 can be for use in storing data and applications, and the processor 130 may execute the applications, and among other things, applications or processes for hosting/changing web content of the website(s) and for detecting unauthorised changes to content of one or more websites the web operator 107a manages, and/or security applications or processes for use in scanning the websites and/or the web operator 106a. Web operators 107b-107q may be configured in a similar manner with similar web operator devices (not shown).

As described previously, the authorised content policy sets for a website are provided by the web operator 107a to the detection system 108. The authorised content policy set may be reported to the detection system 108, provided via a portal server of the detection system, or transmitted to the detection system. In any event, the detection system 108 collects and maintains authorised content policy sets for each of a multiplicity of websites from web operators 107a-107q.

For example, the web operator 107a may compile the authorised content policy set(s) for each website into a report or suitably formatted file, which is sent to the detection system 108 via email, a secure channel (e.g virtual private network (VPN)), or over any suitable communication system, which receives the report or file and maintains the collection of authorised content policy sets for websites for the plurality of the web operators 107a-107q. As another example, the authorised content policy set may be sent from the web operator 107a (e.g. from web operator device 111a) to the detection system 108 via a web portal that provides the detection service with which the web operator 107a has registered. The web operator 107a may use the web portal to submit the authorised content policy sets for the one or more websites operated by the web operator 107a, update the authorised content policy sets, receive alerts from the detection system 108 regarding non-conforming web content or websites in relation to respective authorised content policy sets, and/or send alerts or notification messages to the detection system 108 regarding whether any detected changes in web content are authorised (e.g. legitimate) or unauthorised (e.g. illegitimate or malicious).

In addition or alternatively, the web operator 107a may create a digitally signed manifest associated with one or more website(s) into which one or more authorised content policy set(s) are placed in relation to the corresponding website(s). In this model, the web operator 107a creates the digitally signed manifest including the authorised content policy set that the website should conform to. This digitally signed manifest may be placed on the website server and state the web content that the website server is allowed to offer. Instead of sending directly the authorised content policy set(s) for each website to the detection system 108, sending the authorised content policy set(s) include sending a digital key associated with each manifest to the detection system 108 use in accessing the authorised content policy set(s) in each digitally signed manifest. Optionally, the digital manifest may be an additional file associated with the one or more websites, or each digital manifest may be embedded as a hidden field in one or more web pages of each website. The digital manifest may alternatively be sent to the detection system 108. The digital manifest may be encrypted.

For example, the web operator can report the intended web content of a web page or a website to the detection system 108 by including the authorised content information associated within the web page or the website in the digitally signed information manifest. This manifest contains the authorised content information or the technologies used in the web page or website. The authorised content information may be transformed into an authorised content policy set, which the detection system 108 uses to determine whether the website conforms to the authorised content policy set based on obtained content information from one or more client devices 104a-104m, one or more client gateway devices 105a-105n, and/or one or more client proxy devices 106a-106p. The manifest may either be an additional file (e.g. robots.txt) or embedded as hidden field in the web page or website (e.g. main index.html). Instead of authorised content information, the manifest may contain the authorised content policy set for the web page or the website. The web operator 107a registers their signing key to the detection system 108 when entering the page information or website information that the detection system 108 should be aware of, which the detection system 108 can be use to verify against that signing key for the web page or website.

Alternatively or in addition to, a third party service provider such as an operator or website authorization tool of the detection system 108 (or other security system provider or software) may compile a report or a content policy set based on the website of web operator 107a. This may be performed by performing a "zero" config portal where the detection system, tool, or third party trawls or crawls the website gathering content information associated with the website. The detection system 108 or third party may determine a suitable content policy set based on the content information. The web operator 107a then checks and authorises (or approves) the determined content policy set and/or the trawled/crawled content information, which is then included in the collection or database of authorised content policy sets for the website of web operator 107a.

If the web operator 107a has a good reputation, the authorised content policy sets may include a trust level indicative of the reputation of the web operator 107a or corresponding website. This trust level may be used in addition to the checks as to whether the website conforms with the authorised content policy set to assist in determining whether a change may be considered benign, or actually malicious. For example, if the reputation has a high level of trust, then minor changes to the website may be considered benign. For example, web operators of larger or well established websites (e.g. household named banks, search engines, and/or multimedia/news/magazine websites) may be trusted more than web operators of smaller or recently established websites (e.g. web shops or hobby shops). The latter may be more likely to have been sold and/or hijacked.

In any event, the detection system 108 collects and maintains authorised content policy sets for one or more web sites from the plurality of web operators 107a-107q. The authorised content policy set(s) for a website is used to detect changes to web content of the website, and if a change is detected, then the corresponding web operator 107a is alerted to the change. The change may be benign, in which case the web operator 107a may simply update the authorised content policy set, otherwise, the web operator 107a may update the website and remove any malicious or non-benign content. The web operator 107a may then alert the detection system 108 that the change is either benign (authorised) or malicious (unauthorised).

Client devices 104a-104m, client gateway devices 105a-105n, and/or client proxy devices 106a-106p may be provided with a program or module such as a security/extraction/content inspection program or module that is able to inspect the web content downloaded from a web page and obtain the content information of the downloaded web content. The content information may include, by way of example only, one or more content elements from the group of technologies used in one or more web pages of the website; types of application technologies used in the website; locations of resources from where content of the website is accessed; ratings of content subcategories; user input fields; and types of content allowed for the website.

The client devices 104a-104m are each configured to obtain content information as described herein from web content of web pages or websites downloaded to the client device 104a-104m for those websites that are hosted/handled by one of the web operators 107a-107q. The obtained content information or a web page or a website is sent from the client devices 104a-104m to the detection system 108. It is assumed that the web operators 107a-107q have sent the detection system 108 authorised policy sets corresponding to the websites that each web operator 107a-107q handles. Similarly, if a client gateway device 105a serves a client device 104m, say, the client gateway device 105a may also be configured obtain content information from web content of web pages or websites that the client device 104m may have requested. The obtained content information for a web page or a website is sent from one or more client gateway devices 105a-105n to the detection system 108. As well, a client proxy device 106a may serve client device 1041 with one or more web pages of a website are cached on client proxy device 106a, prior to serving these web pages, the client proxy device 106a may have obtained content information from web content of the web pages or websites cached on the client proxy device 106a. The obtained content information for a web page or a website is sent from one or more client proxy devices 106a-106p to the detection system 108.

The client gateway device 105a and client proxy device 106a may be configured to render the web content as it would be rendered on a client device. In this way, the obtained content information from a client gateway device 105a or client proxy device 106a may match that any obtained content information that would have been obtained by a client device had the client device downloaded the web content. Client gateway devices 105a-105n and client proxy devices 106a-106p being configured to obtain content information and send this information to the detection system 108 provides the advantage of an additional security layer to the communication system 100 against malicious attacks because web operators 107a-107q may be alerted sooner and sometimes (or in most cases) before the web content has been downloaded onto client devices 104a-104m.

Note, client gateway devices 105a-105m and/or client proxy devices 106a-106p (e.g. a content inspection gateway or proxy) may also be provided with rendering modules/programs to render the web content in a similar way (or the same way) as a client device would render the web content. This would then "trick" any malicious content/attack into revealing itself to the client gateway devices 105a-105m and/or client proxy devices 106a-106p. This allows earlier inspection of web content and earlier detection of a change in content of the website delivering such content, which minimises the effects of malicious attacks to websites.

One or more of the client devices 104a-104m, client gateway devices 105a-105n, and/or client proxy devices 106a-106p sends any obtained content information associated with a website of a web operator 107a to the detection system 108. The detection system 108 then checks whether the website associated with obtained content information conforms with the respective authorised content policy set(s) for the website of web operator 107a. As an example, each of the policies or rules of an authorised content policy set may have a weighting associated with it depending on how significant the policy or rule is, or whether partial or total non-conformance to the policy or rule indicates either benign activity or a malicious attack, respectively. The detection system 108 then determines whether the website conforms to the respective authorised content policy set using the obtained content information, in which the weights for each rule or policy are accumulated. If a threshold is reached, then the website may be determined to not conform with the authorised content policy set and the web operator 107a of the website is alerted accordingly.

Although only some methods of determining whether a website conforms with a respective authorised content policy set have been described herein, it is to be appreciated by the person skilled in the art that there are many possible algorithms or methods that may be used to determine whether a website conforms or not to a respective authorised content policy set. For example, a threshold test or method may be used, or rule based tests or methods may be used, or even a decision tree based test or method may be used to determine whether a website conforms to an authorised content policy set based on obtained content information. In any event, the detection system 108 uses the obtained content information with the corresponding authorised content policy set to determine whether the associated website conforms with the corresponding authorised content policy set.

By this method the detection system 108 detects changes in web content and the situation when a website starts to serve content that is not intended by a web operator 107a. This can be indication of a compromised website, compromised advertising or other content feed provider imported by the website that is being accessed by and shown to the users of one or more of the client devices 104a-104m, client gateway devices 105a-105n, and/or client proxy devices 106a-106p. If a change in web content of a website is detected, then there may be unauthorised content being served by the website or web page. The detection of a change (e.g. the determination that a website does not conform to the respective authorised policy set) triggers the detection system 108 to transmit an alert, message or notification to the web operator 107a associated with the website, in which the alert indicates the change in web content of the website. The message may include a report on the detected changes in web content of the website to enable the web operator 107a to quickly check the web pages or the website.

The detection system 108 may further analyse the obtained content information associated a website not conforming to the respective authorised content policy set to determine whether the change in web content is associated with a benign change, unauthorised content, or malicious behaviour. The detection system 108 may make a decision to alert or notify the corresponding one or more of the client devices 104a-104m, client gateway devices 105a-105n, and/or client proxy devices 106a-106p of the change in content of the website. For example, the detection system 108 may alert the corresponding one or more of the client devices 104a-104m, client gateway devices 105a-105n, and/or client proxy devices 106a-106p when the change in content relates to changes in technologies that are known to be used for watering hole and other attacks.

The web operator 107a may receive the alert on the detected changes from detection system 108 and analyse the corresponding web page(s) of the website that may be affected. Through this analysis, the web operator 107a may determine the detected changes are either legitimate due to website updates, or are unauthorised e.g. due to malicious or inappropriate content from an attack or an advertiser in serving inappropriate content. If the detected changes are legitimate, the web operator 107a may notify the server system 108 of the changes to the website and update the authorised content information associated with the changes. If the detected changes are unauthorised, the web operator 107a may alert or notify the detection system 108 that the detected changes were unauthorised.

On detecting the changes in content of the website, the detection system 108 or web operator 107a may contact a security system of the web operator 107a. This enables the security system to monitor transactions by the client devices 104a-104m (and other client devices) accessing the website. For example, if the website is a banking website, the detection system 108 or the web operator 107a may send a message to the bank fraud control system, so they may begin fraud monitoring of users transactions and optionally automatically block transactions they would otherwise check over two channel authorization.

The detection system 108 may also alert or notify the corresponding one or more of the client devices 104a-104m, client gateway devices 105a-105n, and/or client proxy devices 106a-106p of the change in web content. This may cause the one or more of the client devices 104a-104m, client gateway devices 105a-105n, and/or client proxy devices 106a-106p to scan any downloaded web content associated with the changes, to scan all subsequent web content associated with the changes, and/or simply scan all web content from the website, until the web operator 107a confirms that the website had been restored to satisfy the authorised content policy set. For example, the one or more of the client devices 104a-104m, client gateway devices 105a-105n, and/or client proxy devices 106a-106p may include security software or modules that include content scanning modules which are switched on when an alert or notification is received. The content scanning modules may be triggered even on small changes. If a client device, client gateway device, or even a client proxy device reports malware in any new web content from the affected website (e.g. the website that does not conform with the authorised policy rules), the detection system 108 may then notify the content scanning modules of the client devices or even the web operator 107a to block the website until it has been restored to conform with the respective authorised content policy sets.

The detection system 108 may send a warning message or an alarm to the user of the client devices accessing the website that does not conform with the respective authorised content policy sets. For example, the website may be hosting porn content on a web subdirectory, the website may be a Jihad or terrorist communication board, or it may be associated with a plain old parental control false alarm. If the detected change in content information of the website is unauthorised, the detection system 108 may also transmit scanning information to the content scanning modules or other security applications (e.g. anti-virus application(s)) on a client device 104a accessing the website for use in scanning the web content of the website that does not conform with the authorised content policy set. The detection system 108 may further trigger the content scanning modules or other security applications (e.g. anti-virus scanning applications) on one or more of the client devices 104a-104m to switch on website traffic scanning to scan for mismatching web content associated with the changes that would normally not be scanned. For example, if the website helsiginsanomat.fi starts to push executable files and this is the detected change, then the detection system 108 may trigger the content scanning modules or other security software on the client devices 104a-104m accessing this website to begin scanning the executable files.

Alternatively or additionally, the detection system 108 may instruct the client devices 104a-104m to increase their heuristic paranoid levels to scan the web content associated with the web content not conforming with the respective authorised content policy set. For example, unknown executables (e.g. .exe files) from the website helsinginsanomat.fi may be blocked automatically if they have low prevalence or suspicious end location. As an option, the detection system 108 may transmit, to the one or more client devices 104a-104m (or client gateway devices 105a-105n or client proxy devices 106a-106p) accessing the website, security information for blocking access to the web content associated with the non-conformance. For example, a client device 104a accessing the website may be instructed by the detection system 108 or through preferences of the user when receiving an alert or notification of a change in web content from the detection system 108 to block all files or web content that violates the authorised content policy set for the website.

Figure 2:
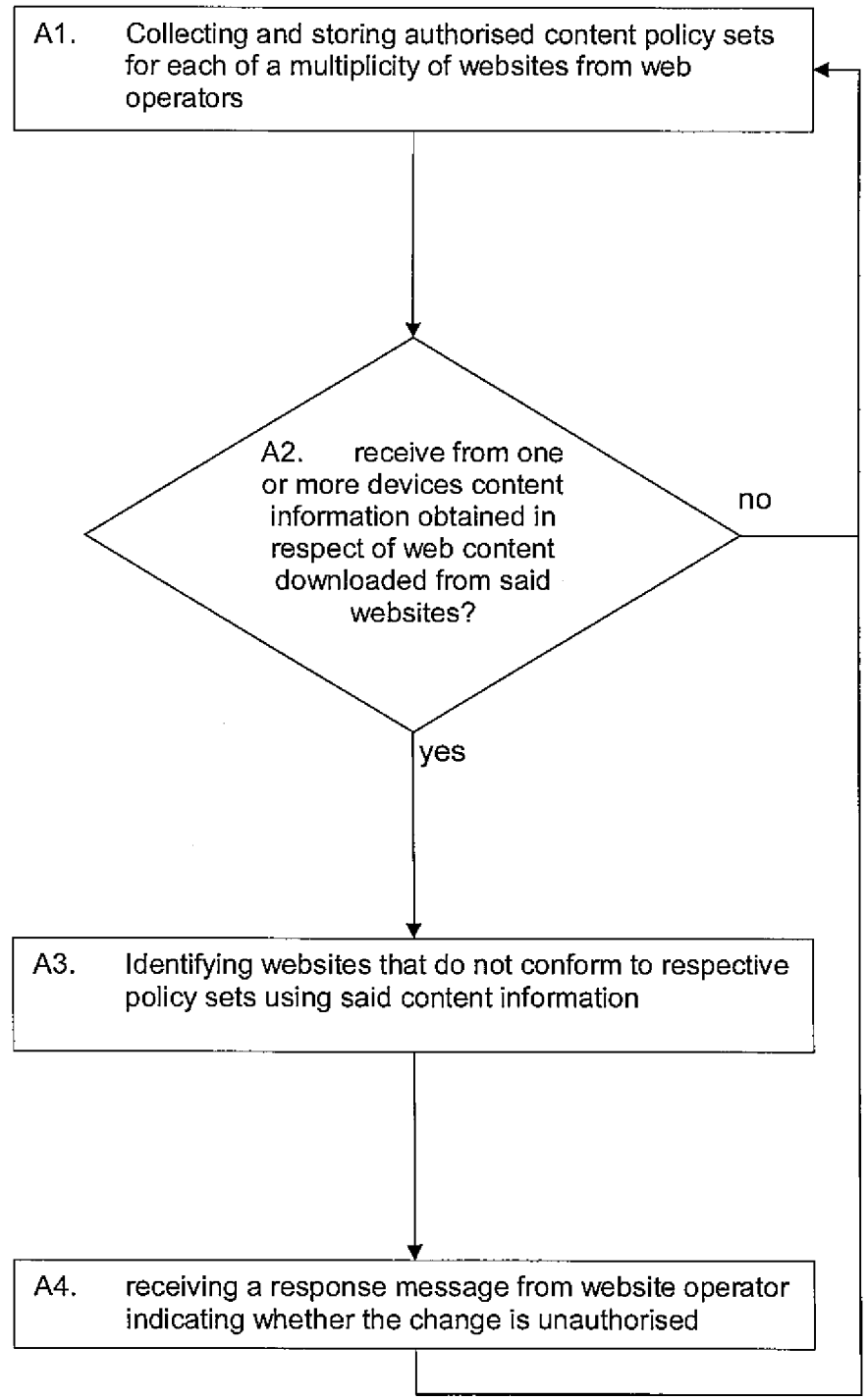
FIG. 2 is a flow diagram illustrating a procedure carried out, by the detection system for detecting unauthorised changes to a website.

FIG. 2 is a flow diagram illustrating a method carried out by a detection system for detecting unauthorised changes to a website of a web operator. The method is outlined by the following steps:

A1. Collecting and storing authorised content policy sets for each of a multiplicity of websites from web operators. Proceed to step A2.

A2. Receive from one or more of a multiplicity of client devices, client proxy devices, or client gateway devices content information obtained in respect of web content downloaded from said websites? if so then proceed to step A3, otherwise proceed to step A1.

A3. Identifying websites that do not conform to respective policy sets using said content information. Proceed to step A4.

A4. Sending an alert to the web operator of any non-conforming website.

The method may include updating the authorised content policy sets for a non-conforming website when the corresponding web operator indicates the change to the non-conforming website is authorised. In addition, the method may include sending the alert to a security system of a web operator for monitoring transactions associated with the non-conforming website made by users of the one or more client devices.

As an option, the method may include sending a warning message to the one or more client devices or gateway devices downloading or having downloaded web content from any non-conforming website. Additionally, prior to sending the warning message the method may include receiving an indication from the web operator that the change to the non-conforming website is unauthorised. Optionally, prior to sending the warning message, the method may include determining, based on the content information associated with the non-conforming website, whether the change to the non-conforming website is unauthorised and/or malicious.

Scanning information associated with the content information of a non-conforming website may be sent to a client device (or a client gateway device or a client proxy device) downloading web content from the non-conforming website, the scanning information for use in scanning downloaded web content associated with the content information of the non-conforming website. The scanning information may only scan the downloaded web content associated with the affected content information of the non-conforming website. Depending on the change in web content to the website, i.e. if the change indicates a malicious attack, then sending to a client device or a client gateway device security information for blocking access to the web content of the non-conforming website. The security information may block access only to the affected web content of the non-conforming website.

The content information includes one or more content elements from the group of technologies used in one or more web pages of the website; types of application technologies used in the website; locations of resources from where content of the website is accessed; ratings of content sub-categories; user input fields; and types of content allowed for the website.

Web operators may register at one or more web portals associated with the detection system for detecting unauthorised changes to websites. Collecting the authorised content policy sets includes receiving, at the portal, authorised content policy sets from each of the web operators. This may include receiving links associating the websites of the web operators with the authorised content policy sets. An alert from the detection system may be sent to the web operator of a non-conforming website via the portal, or alternatively via email or a communication network/system or further web operator detection system (e.g. a fraud control system).

In addition or alternatively, collecting and storing authorised content policies further includes receiving authorised content information for one or more of the websites from one or more web operators, and determining and storing authorised content policy sets based on the authorised content information for the one or more websites.

The alert sent from the detection system may include data identifying the web content or the content information that violates the authorised content policy set of the non-conforming website and/or the one or more rule(s) or policy(ies) of the violated authorised content policy set.

The collecting and storing authorised content policy sets may further include collecting and storing digitally signed manifests from each of the multiplicity of websites, where each website includes a digitally signed manifest including information associated with the authorised content policy sets or authorised content information. A key for each of the digitally signed manifests may be received from the web operator for accessing the corresponding digitally signed manifest. The system then determines, collects and stored, the authorised content policy sets for the multiplicity of websites from the information in the digitally signed manifests.

The method for detecting unauthorised changes to a website of a web operator may be further provided as a detection service to subscribers such as web operators and/or users of client devices to alert the subscribed web operators, users and/or associated client devices of detected changes in websites. The detection service may be a subscription service in which web operators subscribe by registering one or more websites. Once subscribed, the web operators, or operators of the detection service or a trusted third party may upload authorised content policy sets for the registered websites for use by the detection system. The service alerts the web operator via email, a service web portal or over any other pre-arranged communication path or system, when the detection system detects a change in web content of a registered website of the web operator. The detection service may also include a multiplicity of client devices registering with the service, and therefore downloading a web content inspection tool for inspecting and obtaining content information from downloaded web content of registered websites. The registered client devices upload obtained content information from downloaded web content of the registered websites. The detection system uses the obtained content information to identify whether the registered websites conform to respective authorised content policy sets. The detection service sends alerts to the web operator and/or users of the client devices of any non-conforming registered website. The service may include further features of the invention as described herein.

Figure 3:
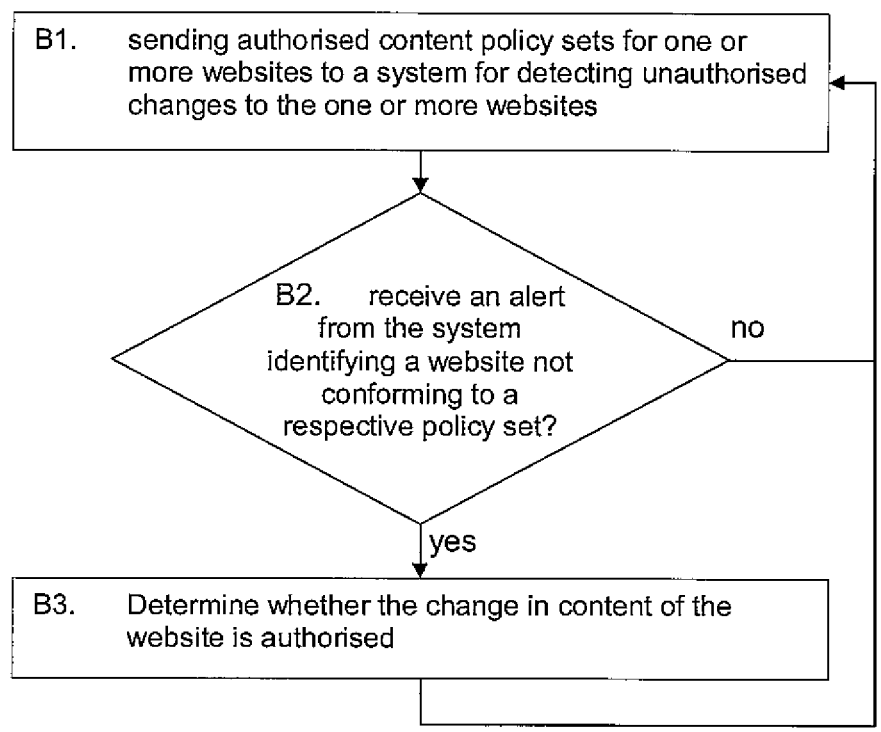
FIG. 3 is a flow diagram illustrating a procedure carried out by a web operator or web operator device for detecting unauthorised changes to a website.

FIG. 3 is a flow diagram illustrating a method carried out by a web operator or web operator system for detecting unauthorised changes to a website of the web operator. The method is outlined by the following steps:

B1. Transmitting authorised content information for the website to a server for use in collecting and detecting unauthorised changes to the website. Proceed to B2.

B2. If a message is received from the server indicating changes in content of the website, then proceed to step B3, otherwise, proceed to step B1. The message may indicate that one or more client devices have received content information for the website that is substantially different to the transmitted authorised content information for the website.

B3. Determine whether the change in content of the website is authorised.

Transmit a response message to the server indicating whether or not the change in web content information is unauthorised. If the change in web content is unauthorised, the web operator may take further action to remove the web content on the website associated with the change in web content. If the change in web content is authorised, the web operator may include updates to the authorised content policy set(s) for the website in the response message so the detection system may update the collection of authorised content policy sets.

The alert may include data identifying the web content or content information that violates the authorised content policy set of the non-conforming website and/or the one or more rule(s) or policy(ies) of the violated policy set. The alert may be received at a security system of the web operator and, if the change to the non-conforming website is unauthorised, performing the step of monitoring transactions associated with the website made by users of the one or more client devices.

The authorised content policy set may include one or more rule(s) and/or policy(ies) associated with content information of a respective website, the content information comprising one or more content elements from the group of: technologies used in one or more web pages of the website; types of application technologies used in the website; locations of resources from where content of the website is accessed; ratings of content subcategories; user input fields; and types of content allowed for the website. The content policy set including whether or not the content information is allowable or not on the website. The content policy set may further include blacklisted web content or content not allowed to be on the website.

Sending authorised content policy sets for one or more websites may further include storing digitally signed manifests for each of the one or more websites. Each digitally signed manifest may include information associated with the authorised content policy sets or authorised content information for a corresponding website. A key may e transmitted for each of the digitally signed manifests to a system for use in determining authorised content policy sets from the information in the digitally signed manifests.

Figure 4:
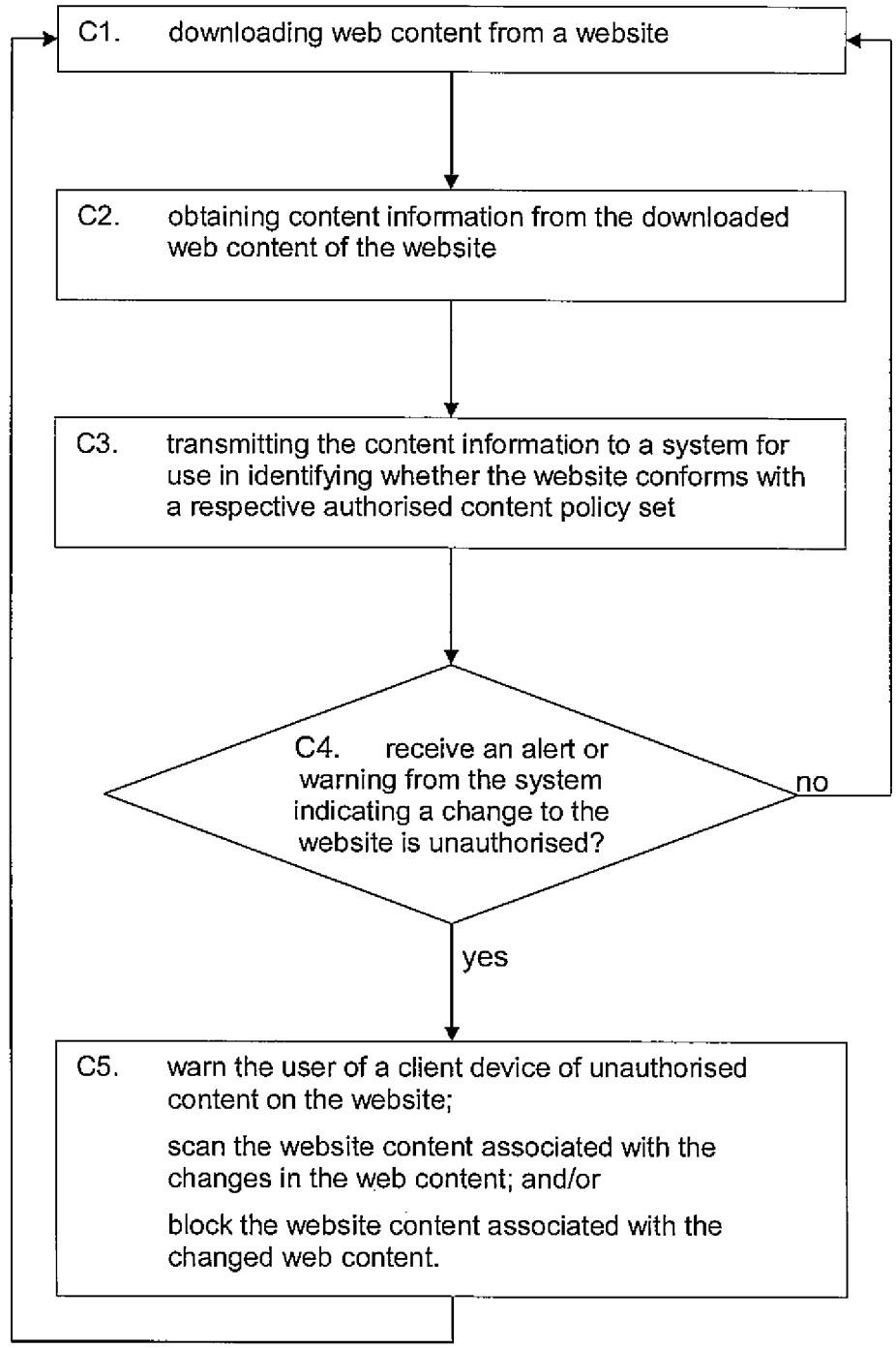
FIG. 4 is a flow diagram illustrating a procedure carried out by an apparatus for detecting unauthorised changes to a website.

FIG. 4 is a flow diagram illustrating a method carried out by an apparatus of a client device, a client gateway device or a client proxy device for detecting unauthorised changes to a website. The method is outlined by the following steps:

C1. Downloading web content from the website. Proceed to C2.

C2. Obtaining content information from the downloaded web content of the website.
Proceed to C3.

C3. Transmitting the obtained content information to a system for use in identifying whether the website conforms with a respective authorised content policy set. Proceed to C4.

C4. If an alert or notification message is received from the system indicating a change to the website is unauthorised? If yes then proceed to step C5. Otherwise, proceed to step C1.

C5. Perform at least one of the following actions:
    warning the user of a client device downloading web content from the website of unauthorised content on the website;
    scan the website content associated with the changes in web content; or
    depending on how malicious the change is, either blocking the web content associated with the changes to the website, or blocking the website.

The apparatus may warn user(s) of the client device(s) downloading the web content of the website of the change and an indication may be included indicating the changes to the website that are unauthorised. The apparatus may receive scanning information associated with the content information of a non-conforming website for scanning downloaded web content associated with the content information of the non-conforming website. The scanning information may be for scanning the downloaded web content associated with the affected content information of the non-conforming website.

Optionally, the apparatus may receive security information for blocking access to the web content of the non-conforming website. The security information may be for blocking access only to the affected web content of the non-conforming website. The alert may indicate that the whole website should be blocked.

The content information includes one or more content elements from the group of technologies used in one or more web pages of the website; types of application technologies used in the website; locations of resources from where content of the website is accessed; ratings of content subcategories; user input fields; and types of content allowed for the website. Obtaining content information further includes the apparatus analysing the web content from the website to identify the one or more content elements and building content information based on the content elements. The client apparatus may be included in at least one of a client device, a client gateway device and a client proxy device.

Methods, apparatus, systems are provided herein for use in detecting unauthorised changes to websites of web operators. Authorised content policy sets for each of a multiplicity of websites from web operators are collected and stored. In addition, content information obtained in respect web content downloaded from said websites by a multiplicity of client devices, client proxy devices, and/or client gateway devices is used to identify websites that do not conform to respective policy sets. Alerts are sent to the web operator of any non-conforming website. Optionally, alerts may be sent to client devices, client gateway devices, and/or client proxy devices for use in scanning or blocking the web content from non-conforming websites.

The server system, servers, client devices, client gateway devices, client proxy devices, web operators and computing systems as described herein each may perform or contribute to the detection of unauthorised changes in content of one or more websites associated with the one or more web operators. The processors of such systems are configured to execute computer program instructions based on the methods and processes described herein, such instructions being contained in a computer-readable medium, such as memory. The computer program instructions may be read into memory from another computer-readable medium or from another device via a communication interface. The instructions contained in memory cause the processor of a server, client device, or web operator system or other such computer system to perform processes or methods as described herein. Alternatively or in addition to, hardwired circuitry may be used in place of or in combination with the computer program instructions to implement processes and methods consistent with the present invention. Examples of hardware circuitry may include, but are not limited to, semiconductor chips, integrated circuits, field programmable gate arrays, application-specific integrated circuits, electronically programmable integrated circuits and the like. Thus, the present invention is not limited to any specific combination of hardware circuitry and/or software.

The computer readable medium may include computer program instructions stored thereon, which when executed on one or more processors of a server, server system, or other computing system, performs the processes or method steps of detecting unauthorised changes to content of a website as described herein. The computer readable medium is a non-transitory computer readable medium e.g. memory or other storage media, such that instructions may be stored thereon. In addition, a computer readable medium including computer program instructions stored thereon, which when executed on one or more processors of a web operator or a client device or other like device, performs the processes or method steps of detecting unauthorised changes to content of a website as described herein.

It will be appreciated by the person of skill in the art that various modifications may be made to the above described embodiments and/or one or more features of the described embodiments may be combined without departing from the scope of the present invention.

The invention claimed is:

1. A method carried out by a system for detecting unauthorised changes to a website, the method comprising:
    collecting and storing authorised content policy sets for each website of a multiplicity of websites hosted at respective locations from a corresponding web operator of each website, the authorised content policy sets comprising one or more rules or policies for determining what content information is allowable or what content information is not allowable on each respective website of the multiplicity of websites;
    receiving from a multiplicity of client devices, client proxy devices, or client gateway devices, content information obtained in respect to web content downloaded from each of said multiplicity of websites hosted at each location of said respective locations, said content information being derived from the web content and structured according to a predefined content information template;
    identifying a website as a non-conforming website of the multiplicity of websites that does not conform to the authorised content policy sets for the identified website based on detecting at least a mismatch of said content information and the authorised content policy sets for the identified website and thereby detecting unauthorised changes to the identified website; and
    based on the identifying, sending an alert to the web operator of the non-conforming website.

2. A method as claimed in claim 1, further comprising updating the authorised content policy sets for the non-conforming website when the web operator of the non-conforming website indicates the changes to the identified website are authorised.

3. A method as claimed in claim 1, further comprising sending a warning message to the one or more client devices or gateway devices downloading or having downloaded web content from the non-conforming website.

4. A method as claimed in claim 3, wherein prior to sending the warning message the method further comprises receiving an indication from the web operator of the non-conforming website that changes to the identified website of the multiplicity of websites are unauthorised changes.

5. A method as claimed in claim 3, wherein prior to sending the warning message, the method further comprises determining, based on the content information associated with the non-conforming website, whether the unauthorized changes to the identified website of the multiplicity of websites is unauthorised or malicious.

6. A method as claimed in claim 1, further comprising sending scanning information associated with the content information of the non-conforming website to a client device or a gateway device downloading web content from the non-conforming website, the scanning information for use in scanning downloaded web content associated with the content information of the non-conforming website.

7. A method as claimed in claim 1, sending to a client device or a gateway device security information for blocking access to the web content of the non-conforming website.

8. A method as claimed in claim 1, wherein the content information comprises one or more content elements of:
    technologies used in one or more web pages of the website;
    types of application technologies used in the website;
    locations of resources from where content of the website is accessed;
    ratings of content subcategories;
    user input fields; and
    types of content allowed for the website.

9. A method as claimed in claim 1, further comprising:
    registering each corresponding web operator at one or more portals associated with the system for detecting unauthorised changes to websites; and
    wherein collecting the authorised content policy sets for each website includes receiving, at a portal of the one or more portals, an authorised content policy sets from each corresponding web operator.

10. A method as claimed in claim 1, wherein the collecting and storing authorised content policies sets further includes:
    receiving authorised content information for one or more of the websites from one or more web operators; and
    determining and storing authorised content policy sets based on the authorised content information for the one or more websites.

11. A method as claimed in claim 1, wherein the alert comprises data identifying the content information that violates the authorized content policy sets of the non-conforming website or the one or more rule(s) or policy(ies) of the violated policy set.

12. A method as claimed in claim 1, wherein:
    collecting and storing authorised content policy sets further includes:
    collecting and storing digitally signed manifests from each of the multiplicity of websites, wherein each website includes a digitally signed manifest including information associated with the authorised content policy sets or authorised content information;
    receiving a key for each of the digitally signed manifests; and
    determining authorised content policy sets from the information in the digitally signed manifests.

13. A method as claimed in claim 1, wherein the content information is enumerated with a template list that contains either present/not present fields, counters or word match fields, and wherein the detecting the mismatch of said content information and the respective authorised content policy set is using the enumerated content information.

14. A method as claimed in claim 1, wherein the respective authorised content policy set comprises snapshots of content information of the web content.

15. A method carried out by a client apparatus for detecting unauthorised changes to a website hosted at a given location, the method comprising:
    downloading web content from the website at said given location;
    obtaining content information from the downloaded web content of the website, said content information being derived from the web content and structured according to a predefined content information template;
    transmitting the content information to a system for use in identifying a non-conforming website that does not conform with respective authorised content policy sets collected from a correspond web operator of the website at said given location based on detecting at least a mismatch of said content information and the respective authorized content policy set for the website to thereby detect unauthorised changes to the website at said given location, the authorized content policy set comprising one or more rules or policies for determining what content information is allowable or what content information is not allowable on the website at said given location; and
    based on the identifying, receiving an alert from the system indicating the website at said given location is a non-conforming website.

16. A method as claimed in claim 15, further comprising receiving scanning information associated with the content information of the non-conforming website for scanning downloaded web content associated with the content information of the non-conforming website.

17. A method as claimed in claim 15, further comprising receiving security information for blocking access to the web content of the non-conforming website.

18. A method as claimed in claim 15, wherein the content information comprises one or more content elements of:
    technologies used in one or more web pages of the website;
    types of application technologies used in the website;
    locations of resources from where content of the website is accessed;
    ratings of content subcategories;
    user input fields; and
    types of content allowed for the website.

19. A method as claimed in claim 18, wherein the obtaining content information further comprises analysing the content from the website to identify the one or more content elements and building content information based on the content elements.

20. A system for detecting unauthorised changes to a website at a given location, the system comprising:
    a processor, memory, transmitter and a receiver, the processor connected to the memory, transmitter and the receiver, wherein:
    the processor and memory are configured to collect and store authorised content policy sets for each website of a multiplicity of websites at respective given locations, wherein each of the authorised content policy sets are collected from a corresponding web operator of each website at said given location;
    the receiver is configured to receive from a multiplicity of client devices, client proxy devices, or client gateway devices content information obtained in respect to web content downloaded from each website of said multiplicity of websites at each of said respective given locations, said content information being derived from the web content and structured according to a predefined content information template;
    the processor is further configured to use said content information to identify a website at a given location as a non-conforming website of the multiplicity of websites that does not conform to the authorised content policy sets based on detecting at least a mismatch of said content information and the authorised content policy sets for a respective website, and thereby detecting unauthorised changes to the respective website at said given location, the policy sets comprising one or more rules or policies for determining what content information is allowable or what content information is not allowable on the respective website of the multiplicity of websites at a respective location of the respective given locations; and
    the processor and transmitter are configured, based on the identifying, to send an alert to the web operator of the non-conforming website at said respective location.

21. A device for detecting unauthorised changes to a website at a given location, the device comprising:
    a processor, memory, transmitter and a receiver, the processor connected to the memory, transmitter and the receiver, wherein:
    the processor, receiver and transmitter are configured to download web content from the website at said given location;
    the processor is further configured to obtain content information from the downloaded web content of the website at said given location, said content information being derived from the web content and structured according to a predefined content information template;
    the transmitter is configured to send the content information to a system for use in identifying a non-conforming website at said given location that does not conform with respective authorised content policy sets collected from a web operator of the website at said given location based on detecting at least a mismatch of said content information and the respective authorised content policy set to thereby detect unauthorised changes to the website at said given location, the policy set comprising one or more rules or policies for determining what content information is allowable or what content information is not allowable on the website at said given location; and the receiver is configured to receive an alert from the system indicating the website at the given location is a non-conforming website.

22. A device as claimed in claim 21, wherein the device is included in at least one of a client device, a client gateway device, and/or a client proxy device.

* * * * *

UNITED STATES PATENT AND TRADEMARK OFFICE
CERTIFICATE OF CORRECTION

PATENT NO. : 10,033,746 B2
APPLICATION NO. : 14/253228
DATED : July 24, 2018
INVENTOR(S) : Jarno Niemela and Veli-Jussi Kesti Page 1 of 1

It is certified that error appears in the above-identified patent and that said Letters Patent is hereby corrected as shown below:

In Claim 22:
Column 27, Line 16, "and/or" should be deleted and --or-- should be inserted.

Signed and Sealed this
Eleventh Day of September, 2018

Andrei Iancu
*Director of the United States Patent and Trademark Office*